United States Patent
Zhuang

(10) Patent No.: US 9,167,497 B2
(45) Date of Patent: Oct. 20, 2015

(54) METHOD FOR SENDING PACKET DATA, BASE STATION, AND MOBILE STATION

(75) Inventor: Hongcheng Zhuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 544 days.

(21) Appl. No.: 12/855,169

(22) Filed: Aug. 12, 2010

(65) Prior Publication Data

US 2010/0302992 A1  Dec. 2, 2010

Related U.S. Application Data

(63) Continuation of application No. PCT/CN2009/071847, filed on May 19, 2009.

(51) Int. Cl.
- *H04W 4/00* (2009.01)
- *H04W 40/04* (2009.01)
- *H04W 40/10* (2009.01)
- *H04W 40/12* (2009.01)
- *H04W 40/32* (2009.01)

(52) U.S. Cl.
CPC .............. *H04W 40/04* (2013.01); *H04W 40/10* (2013.01); *H04W 40/12* (2013.01); *H04W 40/32* (2013.01)

(58) Field of Classification Search
CPC ..... H04W 40/04; H04W 40/32; H04W 40/12; H04W 40/10
USPC .......................................................... 370/313
See application file for complete search history.

(56) References Cited

U.S. PATENT DOCUMENTS

| | | | |
|---|---|---|---|
| 6,801,508 B1 | 10/2004 | Lim et al. | |
| 6,973,053 B1 * | 12/2005 | Passman et al. | 370/310 |
| 6,980,537 B1 | 12/2005 | Liu | |
| 2002/0018448 A1 * | 2/2002 | Amis et al. | 370/255 |
| 2003/0117966 A1 * | 6/2003 | Chen | 370/255 |
| 2003/0227931 A1 * | 12/2003 | Chen et al. | 370/408 |
| 2007/0260716 A1 * | 11/2007 | Gnanasambandam et al. | 709/223 |
| 2007/0298821 A1 * | 12/2007 | Bush | 455/507 |
| 2009/0034432 A1 * | 2/2009 | Bonta et al. | 370/255 |
| 2009/0059795 A1 * | 3/2009 | Fonseca et al. | 370/236 |

FOREIGN PATENT DOCUMENTS

| | | |
|---|---|---|
| CN | 1273473 A | 11/2000 |
| CN | 101114995 A | 1/2008 |
| CN | 101247628 A | 8/2008 |

(Continued)

OTHER PUBLICATIONS

Extended European Search Report, mailed Apr. 19, 2011, in corresponding European Application No. 09839842.3 (8 pp.).

(Continued)

*Primary Examiner* — Luat Phung
(74) *Attorney, Agent, or Firm* — Staas & Halsey LLP

(57) ABSTRACT

A method for sending packet data is provided, which includes the following steps. Packet data from a source mobile station (MS) is received. The packet data includes an identity of a destination MS. A routing cache table is searched for a path to the destination MS. An interface is selected if the path to the destination MS is found. The packet data is forwarded through the selected interface according to the found path. Other two methods for sending packet data corresponding to the method for sending packet data as well as an MS and a base station (BS) corresponding to the method for sending packet data are provided. Therefore, link processing can be performed at the MS.

9 Claims, 9 Drawing Sheets

(56) References Cited

FOREIGN PATENT DOCUMENTS

| | | |
|---|---|---|
| EP | 1453246 | 9/2004 |
| JP | 2007-306460 | 11/2007 |
| JP | 2007306460 | 11/2007 |
| WO | WO 01/45437 | 6/2001 |
| WO | WO 2007/148174 | 12/2007 |

OTHER PUBLICATIONS

Written Opinion of the International Searching Authority mailed Feb. 25, 2010 issued in corresponding International Patent Application No. PCT/CN2009/071847.

Chinese Office Action dated Dec. 8, 2011 issued in corresponding Chinese Patent Application No. 200980123652.1.

Form PCT/ISA/220, mailed Feb. 25, 2009, in corresponding International Application PCT/CN2009/071847 (3 pp.).

Form PCT/ISA/210, mailed Feb. 25, 2009, in corresponding International Application PCT/CN2009/071847 (3 pp.).

Form PCT/ISA/237, mailed Feb. 25, 2009, in corresponding International Application PCT/CN2009/071847 (3 pp.).

Communication Pursuant to Article 94(3) EPC, mailed Sep. 26, 2012, in corresponding European App. No. 09839842.3 (6 pp.).

Chinese Office Action dated Feb. 8, 2014 in corresponding Chinese Patent Application No. 201210113736.0 (6 pages).

* cited by examiner

METHOD FOR SENDING PACKET DATA, BASE STATION, AND MOBILE STATION

CROSS-REFERENCE TO RELATED APPLICATIONS

This application is a continuation of International Application No. PCT/CN2009/071847, filed on May 19, 2009, which is hereby incorporated by reference in its entirety.

FIELD OF THE TECHNOLOGY

The present invention relates to the filed of communications technology, and more particularly to a method for sending packet data, a base station (BS), and a mobile station (MS).

BACKGROUND OF THE INVENTION

A multi-hop relay is a measure executed when a network has no fixed access points, which is first researched and applied in an adhoc network. An adhoc network has no fixed infrastructure and no fixed routers, in which all nodes are mobile and all the nodes can keep contact with other nodes in a random mode dynamically. All nodes are equal in the network, and no central control node needs to be set. The node in the network not only has functions needed by an ordinary mobile station (MS), but also has a packet forwarding capability. In such an environment, due to the limitation of wireless coverage of the MS, two user MSs that are incapable of direct communication can perform packet forwarding through other nodes, which is referred to as multi-hop communication. In recent years, the multi-hop relay technology is applied in the conventional cell network, and the establishment of a new-type cell multi-hop network also becomes a new research focus in the wireless communication. In a cell multi-hop network, an MS can be connected to a corresponding cell base station (BS) through one or more relay nodes. The use of the relay nodes decreases a path loss and improves communication quality of each transmission link, so that capacity and coverage of the entire cell of origin are greatly increased. In the cell multi-hop network, it is very important for performance improvement of the entire system to find suitable relay nodes, and therefore an effective routing algorithm is required.

A method for sending packet data in the prior art is described as follows. In consideration of a feature that a cell multi-hop network is centered on the BS, a conventional distributed routing mode is changed into a centralized processing mode that the BS provides routing for each node in a unified mode. The BS maintains statuses of links among all MSs, and selects paths for communication of the MSs in a centralized mode according to the maintained link statuses. Through the centralized processing mode, the BS can gradually obtain a topological structure of the cell by processing and maintaining information acquired in the routing process.

In addition, in consideration of a two-hop access cell, when a relay is needed as the quality of a link between the MS and the BS is deteriorating, a relay request is first sent to the BS to require the BS to provide a multi-hop routing. If the BS cannot find the path, the MS broadcasts a relay-request routing signal to nearby nodes. After receiving the relay request, an intermediate node returns a signaling to the BS. Therefore, the BS can obtain quality of a first-hop link and measure quality of a second-hop link. Thus, every time a relay request response sent by an intermediate node is received, the BS updates its own channel quality matrix once. After the channel quality matrix is completely updated, the BS executes the routing algorithm again. At this time, the BS has obtained all channel information related to the MS, so that a relay node is selected and the selected relay node is returned to the MS as a feedback, so as to enable the MS to send packet data through the relay node.

During the research of the prior art, the inventor finds that by using the method for sending packet data in the prior art, a relay request needs to be sent for packet relay distribution each time and the BS perform all the link processing, This results large resource overhead of the BS and high communication complexity.

SUMMARY OF THE INVENTION

The present invention embodiment is directed to a method for sending packet data, a base station (BS), and a mobile station (MS), so as to perform link processing at the MS.

The present invention provides a method for sending packet data, which includes the following steps.

Packet data from a source MS is received. The packet data includes an identity of a destination MS.

A routing cache table is searched for a path to the destination MS.

An interface is selected if the path to the destination MS is found.

The packet data is forwarded through the selected interface according to the found path.

The present invention further provides a method for sending packet data, which includes the following steps.

Packet data that needs to be sent is obtained.

It is determined whether an access status is direct access.

If the access status is direct access, the packet data is sent to a BS.

If the access status is not direct access, a cluster head is selected from a cluster head table, and the packet data is sent to the cluster head.

The present invention further provides an MS, which includes a receiving unit, a searching unit, a selecting unit, and a sending unit.

The receiving unit is adapted to receive packet data from a source MS. The packet data includes an identity of a destination MS.

The searching unit is adapted to search a path to the destination MS in a routing cache table according to the identity of the destination MS received by the receiving unit.

The selecting unit is adapted to select an interface when the path to the destination MS is found by the searching unit.

The sending unit is adapted to forward the packet data through the interface selected by the selecting unit according to the path to the destination MS found by the searching unit.

As can be seen from the technical solutions in the embodiments of the present invention, because the MS in the embodiments can determine a mode of sending the packet data according to its own access status and the cluster head table is maintained in the MS, only a cluster head needs to be selected from the cluster head table when the packet data is sent and then the packet data is sent to the cluster head or directly sent to the BS. As long as information of the cluster head exists in the cluster head table, the MS does not need to send a relay request to the BS when the packet data is sent, that is, the link processing is performed at the MS, so that resource overhead of the BS is decreased and the MS only needs to maintain the information of the cluster head, thereby reducing the communication complexity.

BRIEF DESCRIPTION OF THE DRAWINGS

To illustrate the technical solution according to the embodiments of the present invention or in the prior art more clearly, the accompanying drawings for describing the embodiments or the prior art are provided briefly below. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The following detailed description is directed to the technical solution of the present invention with reference to the accompanying drawings. However, the embodiments to be described are only part of, rather than all of, the embodiments of the present invention. All other embodiments, which can be derived by those skilled in the art from the embodiments given herein without any creative efforts, fall within the scope of the present invention.

Figure 1:
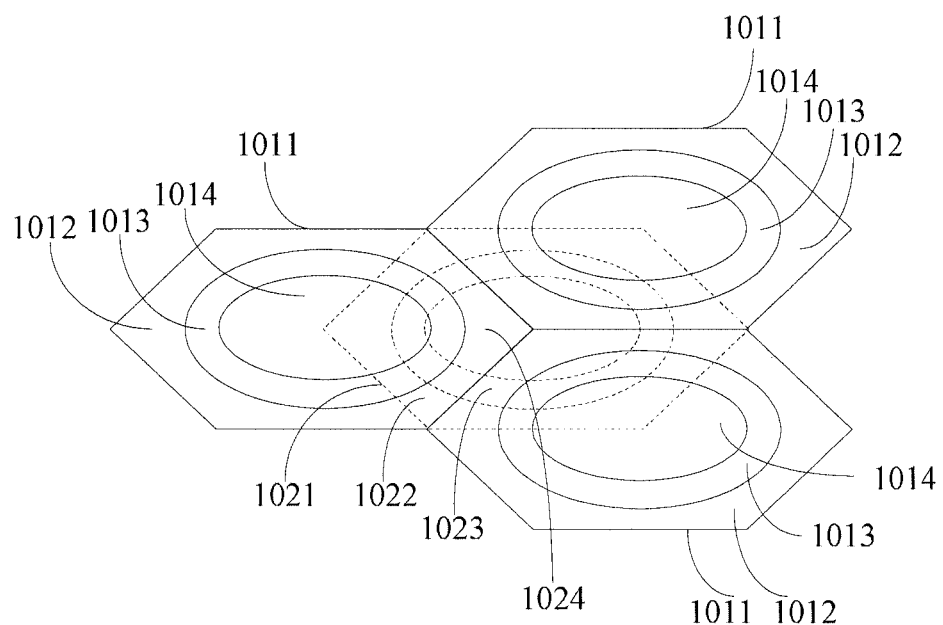
FIG. 1 is an architectural view of a cell adhoc network according to an embodiment of the present invention.

A cell adhoc network related to the embodiment of the present invention is first introduced. Architecture of the cell adhoc network provided in the embodiments of the present invention is shown in FIG. 1.

Different sector clusters inside the cell form an intra-cell virtual cluster 1011. The cluster heads in the intra-cell virtual cluster perform inter-sector cooperation, so that a mobile station (MS) can access flexibly.

The sector clusters in adjacent cells form an inter-cell virtual cluster 1021. The cluster heads of the inter-cell virtual cluster perform inter-cell cooperation, so as to facilitate inter-cluster communication and inter-cell load balance during hybrid access and cooperative access.

The intra-cell virtual cluster is divided into hybrid access zones 1012, cluster head zones 1013, and direct access zones 1014 according to a distance away from a base station (BS). A hybrid access zone is the farthest away from the BS and a direct access zone is the nearest to the BS. If an MS is located in a direct access zone and a cluster head zone, an access status of the MS can be direct access. If the MS is located in the hybrid access zone, the MS can access the BS through cell relay and at this time the access status of the MS can be cooperative access. Alternatively, the MS can access the BS through adhoc relay and at this time the access status of the MS can be hybrid access. If the MS is unable to receive information of the BS and the cluster head, the access status of the MS is "adhoc". The access statuses of the MS in different access zones are shown in Table 1.

TABLE 1

| Communication Mode | Access Zone | MS Access Status | Description |
|---|---|---|---|
| Cell access (direct access and hybrid access to the BS) | Direct access zone, cluster head zone | Direct access S = 00 | Direct access to the BS |
| | Hybrid access zone | Cooperative access S = 01 | Access to the BS through cell relay |
| | Hybrid access zone | Hybrid access S = 11 | Access to the BS through adhoc relay |
| Adhoc access (no access to the BS) | Direct access zone, Hybrid access zone, Cluster head zone | Adhoc S = 10 | Adhoc access |

The inter-cell virtual cluster is divided into hybrid access zones 1022, cluster head zones 1023, and direct access zones 1024 according to a distance away from a center of the inter-cell virtual cluster. A hybrid access zone is the farthest away from the center of the inter-cell virtual cluster and a direct access zone is the nearest to the center of the inter-cell virtual cluster.

In order to realize the operability and manageability of the MS adhoc mode, the selection and clustering of the cluster heads in the embodiments of the present invention are initiated by the BS. The selection and clustering of the cluster heads can be performed periodically or when triggered by an event, for example, after the BS receives a relay request sent by the MS. In an embodiment of the present invention, the selection and clustering of the cluster heads can be performed according to the following process.

The BS broadcasts a cluster-head selection request within the coverage of the local cell. The cluster-head selection request carries parameters such as location information of the BS, a cell radius R, a cell utilization U, and a cluster-head threshold value C. The MS that receives the cluster-head selection request calculates a distance L between the MS itself and the BS. If the L is greater than a threshold value 1 (in an embodiment of the present invention, the threshold value 1 can be R/2) and smaller than a threshold value 2 (in an embodiment of the present invention, the threshold value 2 can be 3R/4), it indicates that the MS is located in the cluster head zone and the MS sets the access status S as direct access. Otherwise, it indicates that the MS is located in the direct access zone or the hybrid access zone, and at this time the access status S of the MS can be first set as direct access and subsequently the access status S is updated by the MS according to a cluster head advertisement.

The MS located in the cluster head zone estimates quality of a link between the MS itself and the BS according to information of the cluster-head selection request. The quality of the link between the MS and the BS can be a path loss $P_{Loss}$. The MS then determines whether the requirement of the cluster head selection is satisfied according to its own rest energy information $N_{Rest}$. In an embodiment of the present invention, if $P_{Loss}/N_{Rest}<C$ for an MS, it indicates that the MS satisfies the requirement of the cluster head selection, and therefore the MS sends a cluster head advertisement. Information of the cluster head advertisement includes resource information of the MS and utilization U of the cell in which the MS is located. The resource information of the MS includes rest energy of the MS and a path loss between the MS and the BS. The sent cluster head advertisement can be a cell cluster head advertisement and adhoc cluster head advertisement.

The MS that receives the cluster head advertisement updates the access status and the cluster head table.

If a default access status S of the MS is "adhoc", the MS that can receive the cell cluster head advertisement updates S to "cooperative access". The MS that can only receive the adhoc cluster head advertisement updates the S to "hybrid access".

If the default access status S of the MS is "direct access", the cell cluster head advertisement can be received, the distance L between the MS and the BS is greater than the threshold value 2, and the MS updates the S to "cooperative access".

In an embodiment of the present invention, the cluster head table maintained by the MS can be as shown in Table 2.

TABLE 2

| Cluster Head ID | Cell Utilization | Rest Energy | Path Loss |
|---|---|---|---|
| MS 4 | U1 | $N_{RestCell4}$ $N_{Rest4}$ | $P_{LossCell4}$ $P_{Loss4}$ |
| MS 5 | U1 | $N_{RestCell5}$ $N_{Rest5}$ | $P_{LossCell5}$ $P_{Loss5}$ |
| MS 12 | U2 | $N_{RestCell12}$ $N_{Rest12}$ | $P_{LossCell12}$ $P_{Loss12}$ |
| ... | ... | ... | ... |

In Table 2, the $P_{LossCell}$ is a path loss of a link between an MS cell interface and a cluster head, the $N_{RestCell}$ is energy of the cell interface, the $P_{Loss}$ is a link path loss between the MS adhoc interface and the cluster head, and the $N_{Rest}$ is energy of the adhoc interface. When the $P_{LossCell}$ is infinite or the $N_{RestCell}$ is zero, it represents that the cell interface is unavailable.

In an embodiment of the present invention, the energy of the cell interface and the energy of the adhoc interface are managed in a unified mode, and at this time $N_{RestCell} = N_{Rest}$.

After finishing update of the access status and the cluster head table, the MS performs confirmation of the cluster head advertisement, and the confirmation of the cluster head advertisement carries resource information and the access status of the MS. The resource information of the MS can include rest energy of the MS and a path loss of the link between the MS and the BS. Specifically, the resource information of the MS can include rest energy of the cell interface of the MS, a path loss of a link between the cell interface and the BS, rest energy of the adhoc interface of the MS, and a path loss of a link between the adhoc interface and the BS.

After receiving the confirmation of the cluster head advertisement from the MS, the cluster head updates a virtual cluster table maintained by the cluster head according to the information carried in the confirmation of the cluster head advertisement. In an embodiment of the present invention, the virtual cluster table maintained by the cluster head is as shown in Table 3.

TABLE 3

| Member ID | Cluster Head Mark | Access Status | Rest Energy | Path Loss | BS Path Loss |
|---|---|---|---|---|---|
| MS 2 | No | Direct access | $N_{RestCell2}$ $N_{Rest2}$ | $P_{LossCell2}$ $P_{Loss2}$ | $P_{LossBS2}$ |
| MS 3 | No | Cooperative access | $N_{RestCell3}$ $N_{Rest3}$ | $P_{LossCell3}$ $P_{Loss3}$ | $P_{LossBS3}$ |
| MS 4 | Cluster head in the local zone | | $N_{Rest4}$ | $P_{Loss4}$ | $P_{LossBS4}$ |

TABLE 3-continued

| Member ID | Cluster Head Mark | Access Status | Rest Energy | Path Loss | BS Path Loss |
|---|---|---|---|---|---|
| MS 5 | Cluster head in an adjacent zone | | $N_{Rest5}$ | $P_{Loss5}$ | $P_{LossBS5}$ |

After updating the virtual cluster head table, the cluster head gives a cluster-head selection response. The cluster-head selection response can carry resource information of the cluster head and the information of the virtual cluster table maintained by the cluster head. The resource information of the cluster head can include the rest energy of the cluster head and the path loss of the link between the cluster head and the BS. In order to decrease interferences and facilitate management of the BS, in an embodiment of the present invention, only the cell interface is used for communication between the cluster head and the BS, and at this time the resource information of the cluster head can be specifically the rest energy of the cell interface of the cluster head and the path loss of the link between the cell interface and the BS.

After receiving the cluster-head selection response from the cluster head, the BS updates the MS status table according to the information carried in the cluster-head selection response. In the embodiment that only the cell interface is used for the communication between the cluster head and the BS according to the present invention, the MS status table maintained by the BS is as shown in Table 4.

TABLE 4

| Member ID | MS Access Status | Cluster head list/ Rest Energy | Path Loss |
|---|---|---|---|
| MS 1 | Direct access | $N_{Restcell1}$ | $P_{Losscell1}$ |
| MS 11 | Cooperative access | (MS 1, $P_{Loss11-1}$), (MS 13, $P_{Loss11-13}$) | $P_{Losscell11}$ |
| MS 12 | Hybrid access | MS 1, MS 13 | |
| MS 13 | Direct access | $N_{Restcell13}$ | $P_{Losscell3}$ |
| ... | ... | ... | ... |

The BS processes the information of the virtual cluster table reported by the cluster head. For the cluster heads of the same MS, information of a cluster head list of the MS is formed, so that the BS only needs to save only information of rest energy of the cluster heads. Based on a virtual cluster head mechanism of clustering zones, cluster heads serve as convergence points of signaling information, so that overhead of the BS is greatly reduced and further reliability can be increased as the signaling convergence points are not single.

Figure 2:
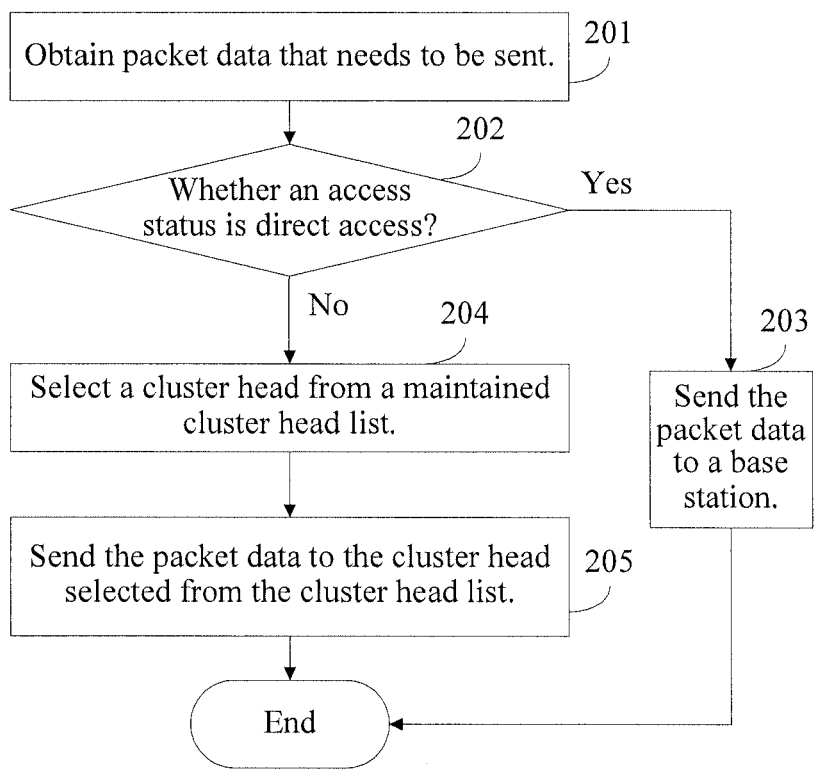
FIG. 2 is a flow chart of a method for sending packet data according to a first embodiment of the present invention.

The method for sending packet data according to an embodiment of the present invention is illustrated in the following. FIG. 2 shows a process of the method for sending packet data according to the first embodiment. In this embodiment, a processing process of a source MS is illustrated, which includes the following steps.

In step 201, packet data that needs to be sent is obtained.

In step 202, it is determined whether an access status is direct access; if yes, the process turns to step 203; and otherwise, the process turns to step 204.

Different access modes are used for different access statuses of the MS. In an embodiment of the present invention, default packet-data sending mechanisms for the MS in different access statuses are as shown in Table 5.

TABLE 5

| MS status | Default Packet-data Sending Mechanism |
| --- | --- |
| Direct Access | The packet data is sent to a BS directly and the BS is in charge of forwarding the packet data. A cell interface is used. If a user requires use of an adhoc mode, a relay point is selected from a cluster head list. |
| Cooperative access | In a cooperative mechanism, a relay point is selected from the cluster head list for access. A cell interface is used. A cluster head in an adjacent zone may be selected for access. |
| Hybrid access | A relay point is selected from a cluster head list for access. An adhoc interface is used. A cluster head in an adjacent zone may be selected for access. |
| Adhoc | An adhoc interface is used. The mechanism is a conventional adhoc mechanism. |

In step 203, the packet data is sent to the BS and the process is ended.

In step 204, a cluster head is selected from the maintained cluster head table.

Specifically, a source MS can select a cluster head from a cluster head table according to the following principles.

A. A suitable cell is selected according to the utilization U of a cell in which a cluster head in the cluster head table is located. A cluster head is selected from the selected cell according to resource information of the cluster head. If utilization $U_{local}$ of the cell in which the source MS is located is greater than a threshold value 1 (in an embodiment of the present invention, the threshold value 1 can be 90%) and utilization $U_{adjacent}$ of an adjacent cell is smaller than a threshold value 2 (in an embodiment of the present invention, the threshold value 2 can be 60%), the adjacent cell is selected; and otherwise, the local cell is selected.

B. For cluster heads in the same cell, cluster head selection and interface selection can be performed according to resource information of the cluster heads. In an embodiment of the present invention, if the rest energy of the cluster head has a large amount and quality of a link between a cluster head and the MS is good, the cluster head is more likely to be selected. In an embodiment of the present invention, the cluster head is selected through a combined value of rest energy of a cluster head and a path loss of a link between the cluster head and the MS. The combined value of the rest energy of the cluster head and the path loss of the link between the cluster head and the MS can be calculated through the following formula:

$$\arg\min(P_{Loss}^{\alpha}/N_{Rest}), \alpha \geq 1$$

The $P_{Loss}$ is a path loss of a link between an MS adhoc interface and a cluster head, and the $N_{Rest}$ is energy of the adhoc interface.

After the combined value of the rest energy of the cluster head and the path loss of the link between the cluster head and the MS is calculated through the formula, a cluster head having a larger combined value is selected, so that the cluster head and interface having the optimal combined value of the rest energy and path loss are selected. Specifically, if the selected cluster head is a cell cluster head, the corresponding interface is a cell interface. If the selected cluster head is an adhoc cluster head, the corresponding interface is an adhoc interface.

In an embodiment of the present invention, if the maintained cluster head table is empty, the source MS can send a relay request to a BS, so as to trigger the BS to perform cluster head selection and clustering, so that the source MS can update a cluster head table according to a cluster head advertisement sent by the cluster head, thereby enabling the source MS to select a cluster head from the updated cluster head table.

In step 205, the packet data is sent to a cluster head selected from the cluster head table and the process is ended.

As can be seen from foregoing, in this embodiment, the source MS can determine a mode of sending packet data according to its own access status and a cluster head table is maintained in the MS. When the packet data is sent, a cluster head only needs to be selected from the cluster head table and then the packet data is sent to the cluster head or directly sent to the BS. As long as information of cluster heads exists in the cluster head table, the MS does not need to send a relay request to the BS when the packet data is sent, that is, link processing is performed at the MS, so that resource overhead of the BS is decreased and at the same time the source MS needs to maintain only the information of the cluster heads so that communication complexity can be reduced.

Figure 3:
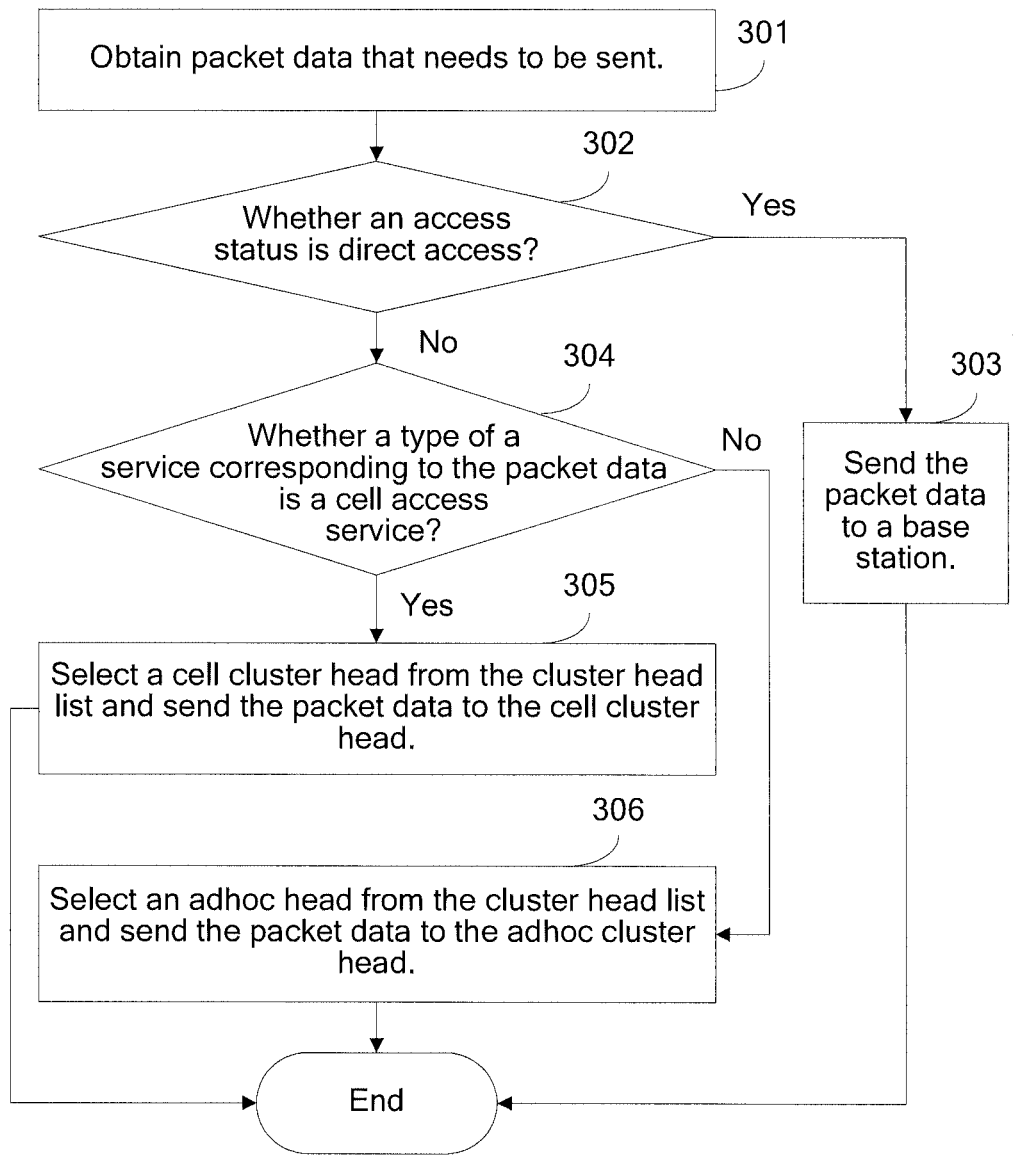
FIG. 3 is a flow chart of a method for sending packet data according to a second embodiment of the present invention.

FIG. 3 shows a process of a method for sending packet data according to a second embodiment. In this embodiment, a processing process of a source MS is illustrated, which includes the following steps.

In step 301, packet data that needs to be sent is obtained.

In step 302, it is determined whether an access status is direct access; if yes, the process turns to step 303; and otherwise, the process turns to step 304.

In step 303, the packet data is sent to the BS and the process is ended.

In step 304, it is determined whether a type of a service corresponding to the packet data is a cell access service; if yes, the process turns to step 305; and otherwise, the process turns to step 306.

As the source MS has an adhoc and cell interface, the source MS can realize cell access and adhoc communication inside a virtual cluster at the same time. The source MS can categorize the services into two major types, namely, cell access services and adhoc services, so that two packet buffers are maintained. For the cell access service, when the cluster head is selected, a cell interface is first selected. For the adhoc service, an adhoc interface is first selected. The services can be categorized according to a use habit of a user, a service distribution situation at an area in which the source MS is located, and characteristics analysis of the services. For a packet having no service category identity, a default packet data sending mechanism is used.

In step 305, a cell cluster head is selected from a cluster head table, the packet data is sent to the cell cluster head, and the process is ended.

In step 306, an adhoc cluster head is selected from the cluster head table, the packet data is sent to the adhoc cluster head, and the process is ended.

As can be seen from foregoing, in this embodiment, the source MS can determine a mode of sending the packet data according to its own access status and a cluster head table is maintained in the MS. When the packet data is sent, only a cluster head needs to be selected from the cluster head table and the packet data is sent to the cluster head or directly sent to the BS. As long as information of the cluster head exists in the cluster head table, the MS does not need to send a relay request to the BS when the packet data is sent, that is, link processing is performed at the MS, so that resource overhead of the BS is decreased and at the same time the source MS needs to maintain only the information of the cluster head, thereby decreasing the communication complexity. Furthermore, the source MS can select an adhoc interface or a cell interface according to a service type corresponding to the packet data when the cluster head is selected, so that the source MS can flexibly select an interface for communication.

In the embodiment of the present invention, before the source MS sends the packet data to the cluster head, the method further includes adding a Time To Live (TTL) field in the packet data and setting a field value of the TTL field. Through the set field value of the TTL field, the cluster head can search adjacent cluster heads according to the field value, so as to increase a success rate of the communication.

Figure 4:
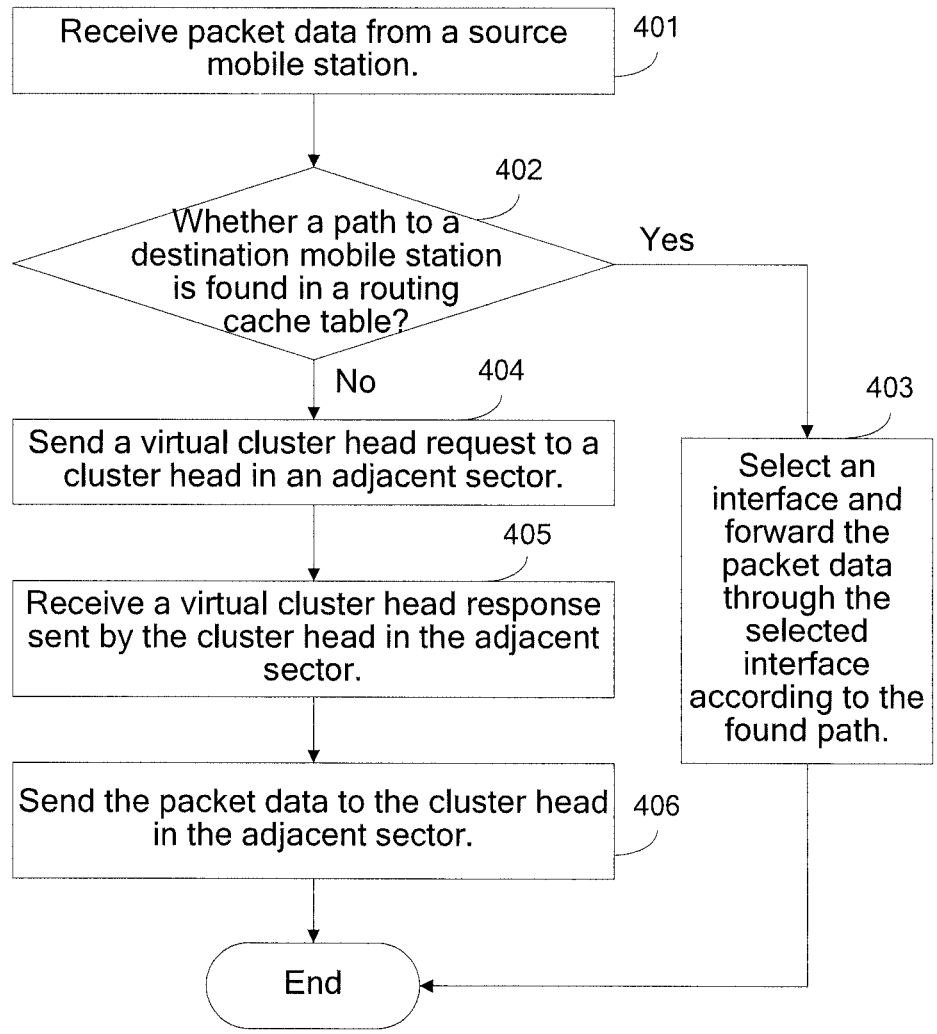
FIG. 4 is a flow chart of a method for sending packet data according to a third embodiment of the present invention.

FIG. 4 shows a process of a method for sending packet data according to a third embodiment. In this embodiment, a processing process of a cluster head is illustrated, which includes the following steps.

In step 401, packet data from a source MS is received. The packet data includes an identity of a destination MS.

In step 402, a routing cache table is searched for a path to the destination MS. If the path to the destination MS is found, the process turns to step 403; if the path to the destination MS is not found, the process turns to step 404.

In an embodiment of the present invention, a routing cache table maintained by a cluster head is as shown in Table 6.

TABLE 6

| Destination MS | Next Hop | Metric | Lifetime |
|---|---|---|---|
| MS 11 | MS 5 | 2 | 10 ms |
| MS 12 | MS 12 | 1 | 10 ms |
| ... | ... | ... | ... |

In step 403, an interface is selected, the packet data is forwarded through the selected interface according to the found path, and the process is ended.

When the interface is selected, resource information of a cell interface of the destination MS and resource information of an adhoc interface of the destination MS recorded in a virtual cluster table can be compared. If the resource information of the cell interface is better than the resource information of the adhoc interface, the cell interface is selected; and otherwise, the adhoc interface is selected. Specifically, a combined value of a path loss of a link between the cell interface and the cluster head of the destination MS and rest energy of the cell interface of the destination MS can be compared with a combined value of a path loss of a link between the adhoc interface and the cluster head of the destination MS and rest energy of the adhoc interface of the destination MS.

In step 404, a virtual cluster head request is sent to a cluster head in an adjacent sector.

The virtual cluster head request includes the identity of the destination MS, so as to facilitate the cluster head in the adjacent sector to search for the destination MS to check whether the destination MS is a member of a sector cluster in which the cluster head in the adjacent sector is located.

In step 405, a virtual cluster head response sent by the cluster head in the adjacent sector is received.

The virtual cluster head response is sent after the cluster head in the adjacent sector finds that the destination MS is the member of the sector cluster.

In step 406, the packet data is sent to the cluster head in the adjacent sector and the process is ended.

Specifically, the packet data can be sent to the cluster head in the adjacent sector through the adhoc interface or the cell interface. In an embodiment of the present invention, in order to decrease interference and facilitate management of the BS, only the adhoc interface is used for communication between the cluster heads, and at this time the packet data is sent to the cluster head in the adjacent sector only through the adhoc interface.

If at least two cluster heads in the adjacent sector send the virtual cluster head response, one cluster head in the adjacent sector can be first selected from the at least two cluster heads in the adjacent sector according to resource information of the cluster heads in the adjacent sector recorded in the virtual cluster table and then the packet data is sent to the selected cluster head in the adjacent sector. Specifically, one cluster head in the adjacent sector can be selected from the at least two cluster heads in the adjacent sector according to the resource information of the adjacent cluster head. For example, the selection can be made according to a combined value of rest energy of the adjacent cluster head and a path loss of a link between the adjacent cluster head and the interface itself.

As can be seen from foregoing, in this embodiment, when no path to the destination MS exists in the routing cache table, the cluster head can send the packet data to a cluster head in the adjacent sector and the packet data is sent to the destination MS through the cluster head in the adjacent sector, so that the packet data does not need to be sent through the BS, that is, the link processing is performed at the MS, thus decreasing resource overhead of the BS. The cluster head needs to maintain only information of the cluster head in the adjacent sector and information of the MS in the cluster, thus decreasing communication complexity.

Figure 5:
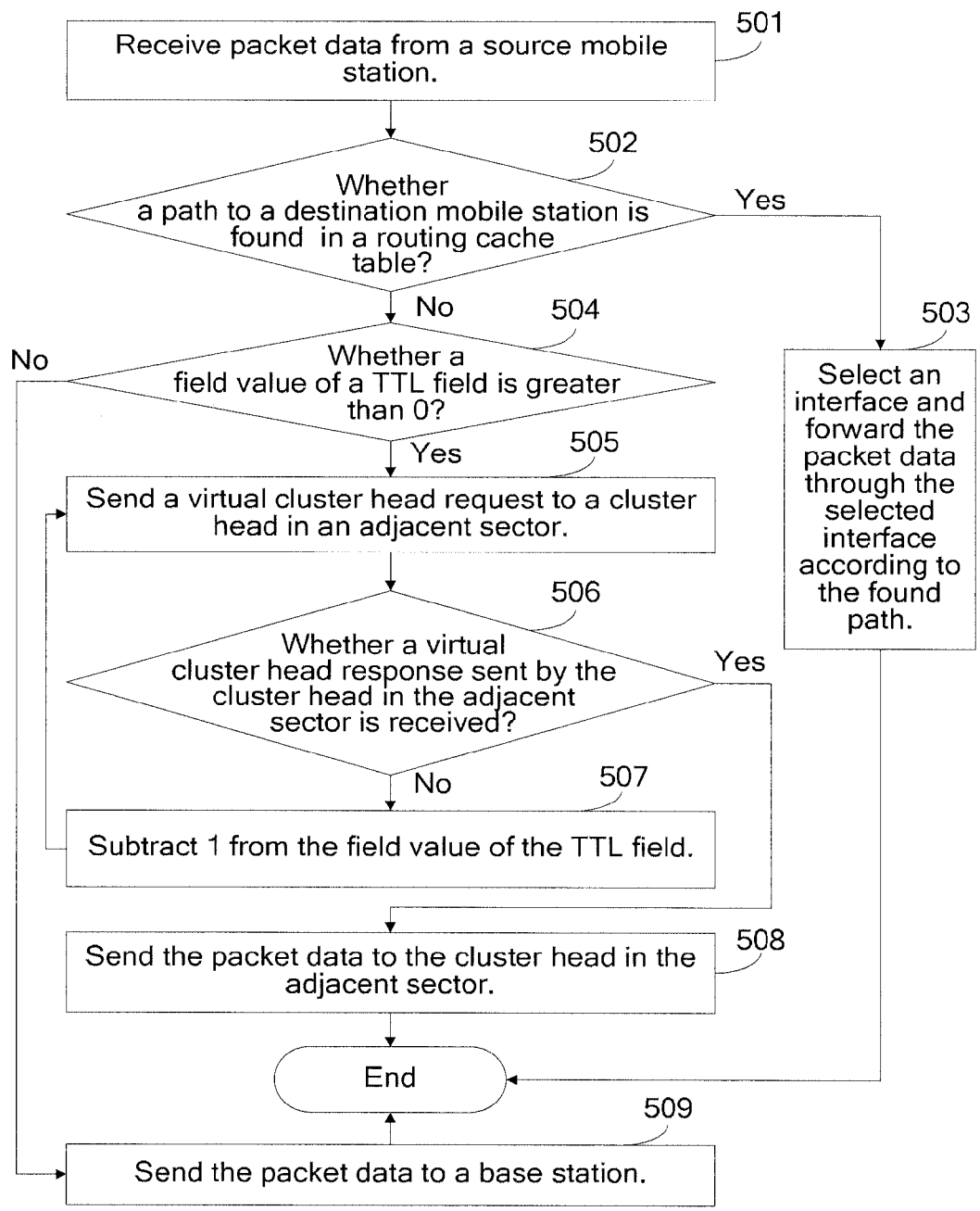
FIG. 5 is a flow chart of a method for sending packet data according to a fourth embodiment of the present invention.

FIG. 5 shows a process of a method for sending packet data according to a fourth embodiment. In this embodiment, a processing process of a cluster head is illustrated, which includes the following steps.

In step 501, packet data from a source MS is received. The packet data includes an identity and a TTL field of a destination MS.

In step 502, a routing cache table is searched for a path to the destination MS. If the path to the destination MS is found, the process turns to step 503; if the path to the destination MS is not found, the process turns to step 504.

In step 503, an interface is selected, the packet data is forwarded through the selected interface according to the found path, and the process is ended.

In step 504, it is determined whether a field value of the TTL field is greater than 0; if yes, the process turns to step 505; and otherwise, the process turns to step 509.

In step 505, a virtual cluster head request is sent to a cluster head in an adjacent sector.

In step 506, it is determined whether the virtual cluster head response sent by the cluster head in the adjacent sector is received; if not, the process turns to step 507; and otherwise, the process turns to step 508.

In step 507, 1 is subtracted from the field value of the TTL field, and the process turns to step 504.

In step 508, the packet data is sent to the cluster head in the adjacent sector and the process is ended.

In step 509, the packet data is sent to the BS and the process is ended.

As can be seen from foregoing, in this embodiment, when no path to the destination MS exists in the routing cache table, the cluster head can send the packet data to the cluster head in the adjacent sector and the cluster head in the adjacent sector send the packet data to the destination MS, so that the BS does not need to send the packet data, that is, the link processing is performed at the MS, thus decreasing resource overhead of the BS. The cluster head needs to maintain only information of the cluster head in the adjacent sector and information of the MS within the cluster, thus decreasing communication complexity. Furthermore, the cluster head can send a virtual cluster head request to the cluster heads in the adjacent sector according to the TTL field in the packet data, so as to expand a communication range and increase a success rate of communication.

In an embodiment of the present invention, in order to enable the cluster head to send the subsequent packet data faster, after sending the packet data, the cluster head can further update the maintained routing cache table according to the sent path.

Figure 6:
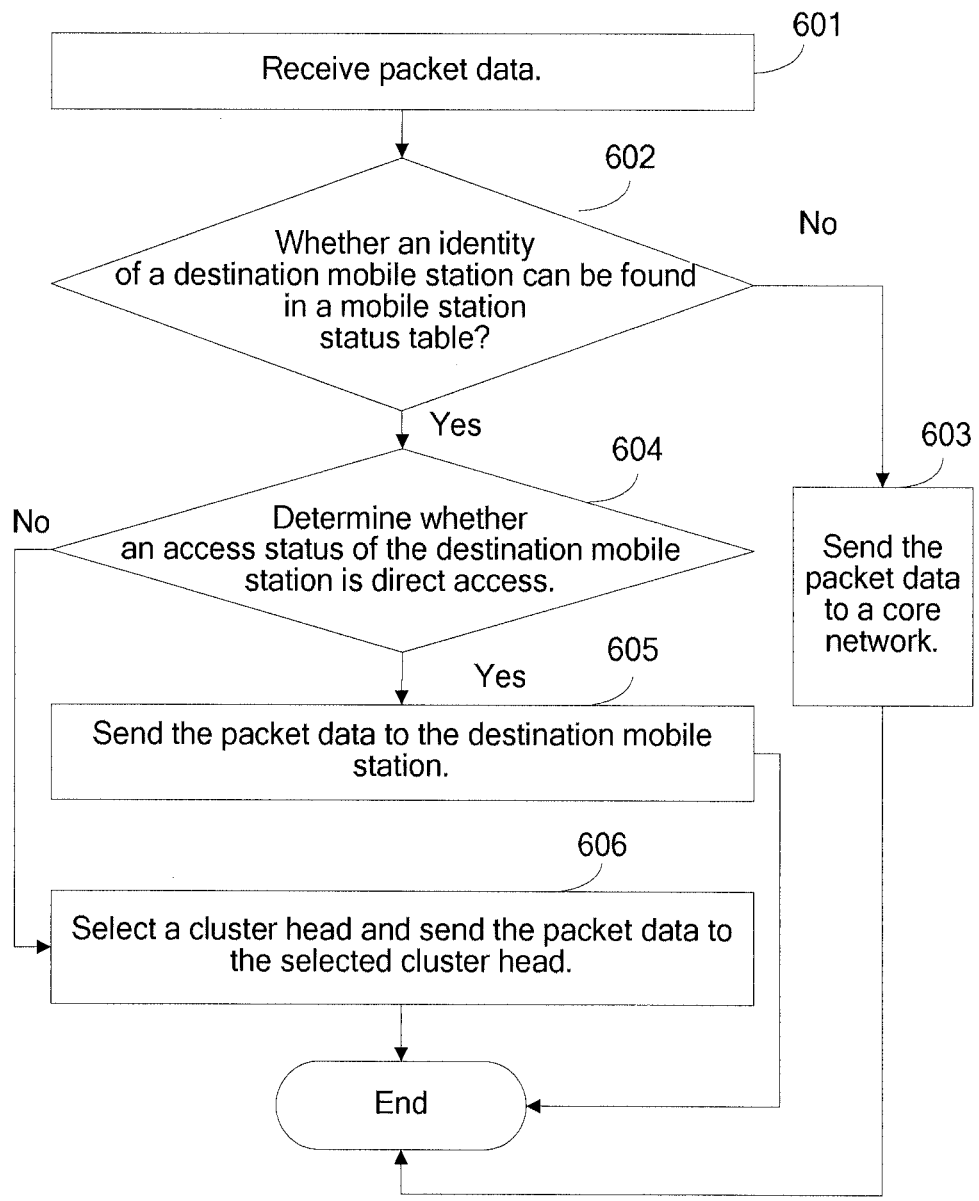
FIG. 6 is a flow chart of a method for sending packet data according to a fifth embodiment of the present invention.

FIG. 6 shows a process of a method for sending packet data according to a fifth embodiment. In this embodiment, a processing process of a BS is illustrated, which includes the following steps.

In step 601, packet data is received. The packet data includes an identity of a destination MS.

In step 602, it is determined whether the identity of the destination MS can be found from an MS status table; if not, the process turns to step 603; and otherwise, the process turns to step 604.

In step 603, the packet data is sent to a core network and the process is ended.

In step 604, it is determined whether an access status of the destination MS is direct access; if yes, the process turns to step 605; and otherwise, the process turns to step 606.

In step 605, the packet data is sent to the destination MS and the process is ended.

In step 606, a cluster head is selected, the packet data is sent to the selected cluster head, and the process is ended.

Specifically, when the access status of the destination MS is hybrid access, a cluster head is selected randomly from a cluster head table and then the packet data is sent to the randomly selected cluster head through an adhoc interface.

When the access status of the destination MS is cooperative access, a cluster head is selected from the cluster head table according to resource information of the cluster head and then the packet data is sent to the selected cluster head through a cell interface. Specifically, a cluster head can be selected from the cluster head table according to a combined value of a path loss of a path between the BS and the cluster head, a path loss of a link between the cluster head and the MS, and rest energy of the cluster head. In the first embodiment of the present invention, the combined value of the path loss of the path between the BS and the cluster head, the path loss of the link between the cluster head and the MS, and the rest energy of the cluster head can be calculated according to the following expression:

$$\arg\min((P_{LossB-C}+P_{LossC-M})^{\alpha}/N_{Rest}), \alpha \geq 1$$

The $P_{LossB-C}$ is the path loss of the link from the BS to the cluster head, and the $P_{LossC-M}$ is the path loss of the link from the cluster head to the MS.

As can be seen from foregoing, in this embodiment, according to the access status of the MS, the BS can send the packet data to the destination MS directly or to the cluster head, so that the cluster head sends the packet data to the destination MS, that is, partial link processing is performed at the MS, thereby decreasing resource overhead of the BS.

Figure 7:
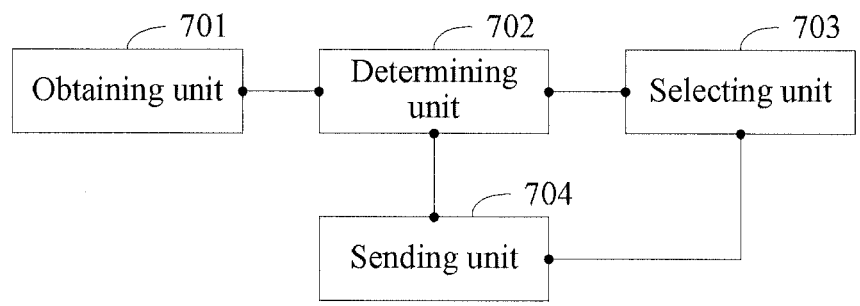
FIG. 7 is a structural view of an MS according to a first embodiment of the present invention.

An MS according to an embodiment of the present invention is illustrated in the following. FIG. 7 shows a structure of an MS according to a first embodiment, which includes an obtaining unit 701, a determining unit 702, a selecting unit 703, and a sending unit 704.

The obtaining unit 701 is adapted to obtain packet data that needs to be sent.

The determining unit 702 is adapted to determine whether an access status of the MS is direct access after the obtaining unit 701 obtains the packet data.

The selecting unit 703 is adapted to select a cluster head from a cluster head table when the determining unit 702 determines that the access status of the MS is not direct access.

The sending unit 704 is adapted to send the packet data to the BS when the determining unit 702 determines that the access status of the MS is direct access, and send the packet data to the cluster head selected by the selecting unit 703 when the determining unit 702 determines that the access status of the MS is not direct access.

As can be seen from the foregoing, in this embodiment, the MS can determine a mode for sending packet data according to its own access status and a cluster head table is maintained in the MS. When the packet data is sent, only a cluster head needs to be selected from the cluster head table and the packet data is sent to the cluster head or sent to the BS directly. As long as information of cluster heads exists in the cluster head table, the MS does not need to send a relay request to the BS when the packet data is sent, that is, link processing is performed at the MS, so that resource overhead of the BS is decreased, and at the same time the MS needs to maintain only the information of the cluster heads, so that communication complexity can be decreased.

In an embodiment of the present invention, the determining unit 702 of the MS can be further adapted to determine a type of a service corresponding to the packet data obtained by the obtaining unit 701 when it is determined that the access status of the MS is not direct access. At this time, the selecting unit 703 of the MS can be further adapted to select a cell cluster head from the cluster head table when the determining unit 702 determines that the type of the service corresponding to the packet data is a cell access service, and select an adhoc cluster head from the cluster head table when the determining unit 702 determines that the type of the service corresponding to the packet data is an adhoc access service. In this embodiment, the MS can select an adhoc interface or a cell interface according to the type of the service corresponding to the packet data during selection of the cluster head, so that the MS can flexibly select an interface for communication.

Figure 8:
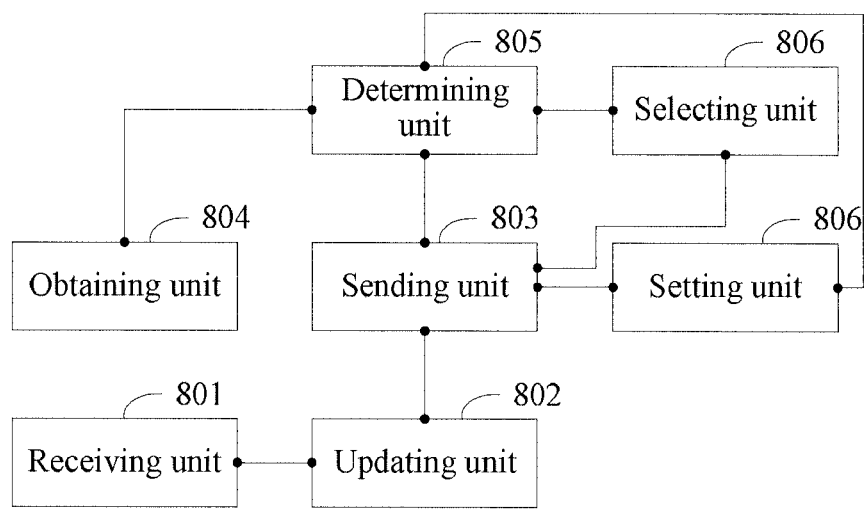
FIG. 8 is a structural view of an MS according to a second embodiment of the present invention.

FIG. 8 shows a structure of an MS according to a second embodiment, which includes a receiving unit 801, an updating unit 802, a sending unit 803, an obtaining unit 804, a determining unit 805, a selecting unit 806, and a setting unit 807.

The receiving unit 801 is adapted to receive a cluster head advertisement from a cluster head. The cluster head advertisement includes resource information of the cluster head and utilization of a cell in which the cluster head is located.

The updating unit 802 is adapted to update an access status according to the cluster head advertisement received by the receiving unit 801 and update a cluster head table according to resource information of the cluster head and the utilization of the cell in which the cluster head is located.

The obtaining unit 804 is adapted to obtain packet data that needs to be sent.

The determining unit 805 is adapted to determine whether the access status of the MS is direct access after the obtaining unit 804 obtains the packet data.

The selecting unit 806 is adapted to select a cluster head from the cluster head table when the determining unit 805 determines that the access status of the MS is not direct access.

The setting unit 807 is adapted to add a TTL field in the packet data and set a field value of the TTL field when the determining unit 805 determines that the access status of the MS is not direct access.

By setting the field value of the TTL field, the cluster head can search an adjacent cluster head according to the field value of the TTL field.

The sending unit 803 is adapted to send cluster head advertisement confirmation to the cluster head. The cluster head advertisement confirmation includes resource information of the MS and the access status after update by the updating unit 802, so as to facilitate the cluster head to update the virtual cluster table. When the determining unit 805 determines that the access status of the MS is direct access, the packet data is sent to the BS. When the determining unit 805 determines that the access status of the MS is not direct access, the packet data in which the TTL field is added by the setting unit 807 is sent to the cluster head selected by the selecting unit 806.

As can be seen from the foregoing, in this embodiment, the MS can determine a mode of sending the packet data according to the access status of the MS itself and a cluster head table is maintained in the MS. When the packet data is sent, only a cluster head needs to be selected from the cluster head table and then the packet data is sent to the cluster head or sent to the BS directly. As long as information of cluster heads exists in the cluster head table, the MS does not need to send a relay request to the BS when the packet data is sent, that is, link processing is performed at the MS, so that resource overhead of the BS is decreased, and at the same time the MS needs to maintain only the information of the cluster heads, so that communication complexity can be decreased. Also, when the MS selects a cluster head, the MS can select an adhoc interface or a cell interface according to a type of a service corresponding to the packet data, so that the MS can flexibly select an interface for communication. Furthermore, the TTL field is added in the packet data, so that the cluster head searches an adjacent cluster head according to the field value, so as to expand a communication range and increase a success rate of the communication.

Figure 9:
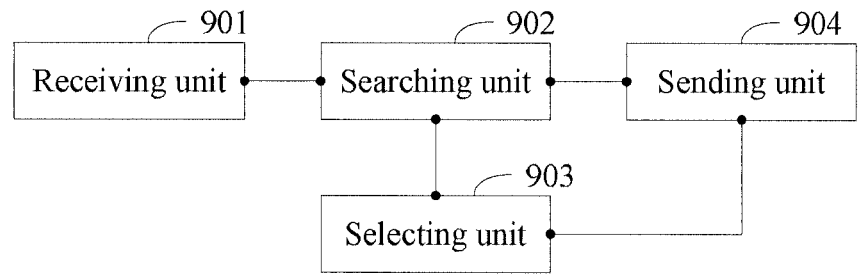
FIG. 9 is a structural view of an MS according to a third embodiment of the present invention.

FIG. 9 shows a structure of an MS according to a third embodiment, which includes a receiving unit 901, a searching unit 902, a selecting unit 903, and a sending unit 904.

The receiving unit 901 is adapted to receive packet data from a source MS. The packet data includes an identity of a destination MS.

The searching unit 902 is adapted to search a path to the destination MS in a routing cache table according to the identity of the destination MS received by the receiving unit 901.

The selecting unit 903 is adapted to select an interface when the searching unit 902 finds the path to the destination MS.

The sending unit 904 is adapted to forward the packet data through the interface selected by the selecting unit 903 according to the path to the destination MS found by the searching unit 902.

As can be seen from the foregoing, in this embodiment, when no path to the destination MS exists in the routing cache table, the MS can send the packet data to a cluster head in an adjacent sector, and the cluster head in the adjacent sector sends the packet data to the destination MS, so that the BS does not need to send the packet data, that is, link processing is performed at the MS, thereby decreasing resource overhead of the BS. In this embodiment, the MS only needs to maintain only information of the cluster head in the adjacent sector and information of the MS within the cluster, so that communication complexity can be decreased.

In an embodiment of the present invention, the sending unit 904 included in the MS can be further adapted to send a virtual cluster head request to the cluster head in the adjacent sector when the searching unit 902 fails to find the path to the destination MS. The virtual cluster head request includes the identity of the destination MS. As the virtual cluster head request includes the identity of the destination MS, the cluster head in the adjacent sector can search for the destination MS to check whether the destination MS is a member of a sector cluster in which the cluster head of the adjacent sector is located according to the identity of the destination MS. The receiving unit 901 included in the MS can be further adapted to receive a virtual cluster head response sent by the cluster head in the adjacent sector. The virtual cluster head response is sent after the cluster head in the adjacent sector finds that the destination MS is the member of the sector cluster. The sending unit 904 can be further adapted to send the packet data to the cluster head in the adjacent sector that sends the virtual cluster head response. Specifically, the sending unit 904 can include a selecting unit adapted to select one cluster head in an adjacent sector from at least two cluster heads in the adjacent sector according to resource information of the cluster heads in the adjacent sector recorded in the virtual cluster table when the receiving unit 901 receives virtual cluster head responses sent by at least two cluster heads in the adjacent sector. A processing unit is adapted to send the packet data to the cluster head in the adjacent sector selected by the selecting unit. In this embodiment, the MS can select a cluster head in the adjacent sector that has the best resource when a plurality of cluster heads in the adjacent sector is selectable, so that communication quality is increased.

Figure 10:
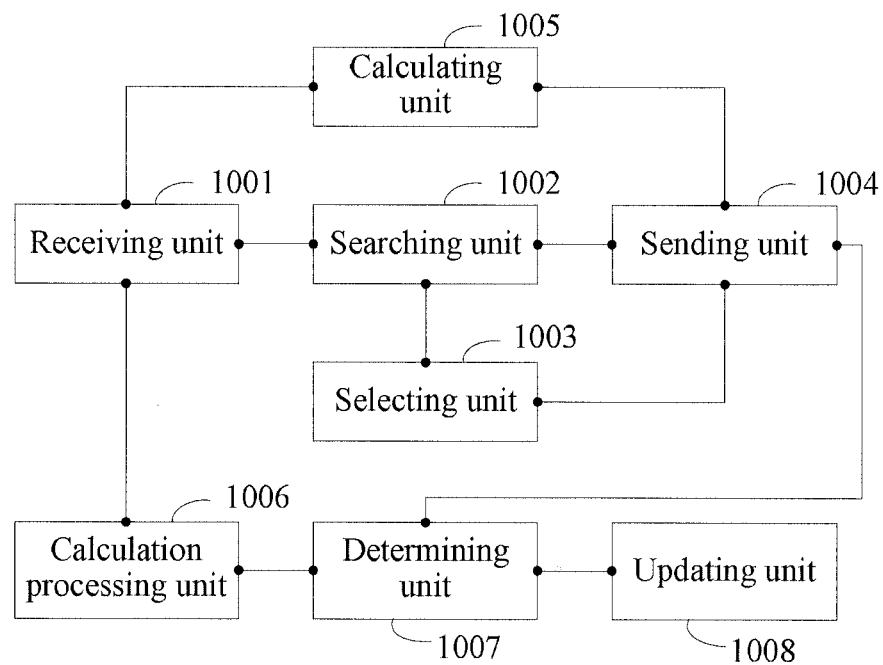
FIG. 10 is a structural view of an MS according to a fourth embodiment of the present invention.

FIG. 10 shows a structure of an MS according to a fourth embodiment, which includes a receiving unit 1001, a searching unit 1002, a selecting unit 1003, a calculating unit 1005, a calculation processing unit 1006, a determining unit 1007, an updating unit 1008, and a sending unit 1004.

The receiving unit 1001 is adapted to receive packet data including an identity of a destination MS from a source MS, receive a virtual cluster head response sent by a cluster head in an adjacent sector after the cluster head in the adjacent sector finds that the destination MS is a member of the sector cluster, receive a cluster-head selection request including a cell radius, cell utilization, and threshold values of the cluster head from a BS, and receive cluster head advertisement confirmation sent by the MS which includes resource information of the MS and an access status of the MS after update.

The searching unit 1002 is adapted to search a path to the destination MS in the routing cache table according to the identity of the destination MS received by the receiving unit 1001.

The selecting unit 1003 is adapted to select an interface when the searching unit 1002 finds the path to the destination MS.

Specifically, in an embodiment of the present invention, the selecting unit 1003 can include a comparing unit and a processing unit. The comparing unit is adapted to compare resource information of a cell interface of the destination MS and resource information of an adhoc interface of the destination MS recorded in a virtual cluster table. The processing unit is adapted to select the cell interface when the comparing unit determines that the resource information of the cell interface is better than the resource information of the adhoc interface, and select the adhoc interface when the comparing unit determines that the resource information of the adhoc interface is better than the resource information of the cell interface.

The calculating unit 1005 is adapted to subtract 1 from a field value of a TTL field when the packet data received by the receiving unit 1001 further includes the TTL field and the receiving unit 1001 does not receive the virtual cluster head response sent by the cluster head in the adjacent sector, so as to trigger the sending unit 1004 to send the virtual cluster head request to the cluster head in the adjacent sector until the field value of the TTL field becomes 0.

The calculation processing unit 1006 is adapted to calculate a distance between the MS and the BS, and determine whether the MS is located in a cluster head zone according to the distance between the MS and the BS and the cell radius received by the receiving unit 1001.

The determining unit 1007 is adapted to determine whether a cluster head threshold value is satisfied according to the resource information of the MS when the calculation processing unit 1006 determines that the MS is located in the cluster head zone.

The updating unit 1008 is adapted to update the access status to direct access when the determining unit 1007 determines that the resource information of the MS satisfies the cluster head threshold value, and update the virtual cluster table according to the resource information of the MS included in the cluster head advertisement confirmation and the access status of the MS after update.

The sending unit 1004 is adapted to forward the packet data according to the path to the destination MS found by the searching unit 1002 through the interface selected by the selecting unit 1003, send a virtual cluster head request including the identity of the destination MS to the cluster head in the adjacent sector when the searching unit 1002 fails to find the path of the destination MS to facilitate the cluster head in the adjacent sector to search for the destination MS to check whether the destination MS is a member of a sector cluster in which the cluster head of the adjacent sector is located, send the packet data to the cluster head in the adjacent sector that sends the virtual cluster head response, send a cluster head advertisement when the determining unit 1007 determines that the resource information of the MS satisfies the cluster head threshold value to facilitate the MS that receives the cluster head advertisement to update the access status, and send a cluster-head selection response including the resource information of the cluster head and information of the virtual cluster table to the BS to facilitate the BS to update the MS status table.

As can be seen from the foregoing, in this embodiment, when no path to the destination MS exists in the routing cache table, the MS can send the packet data to the cluster head in the adjacent sector and the cluster head in the adjacent sector sends the packet data to the destination MS, so that the BS does not need to send the packet data, that is, link processing is performed at the MS, thereby decreasing resource overhead of the BS. In this embodiment, the MS needs to maintain only information of the cluster head of the adjacent sector and the information of the MS within the cluster, so that communication complexity can be decreased.

Figure 11:
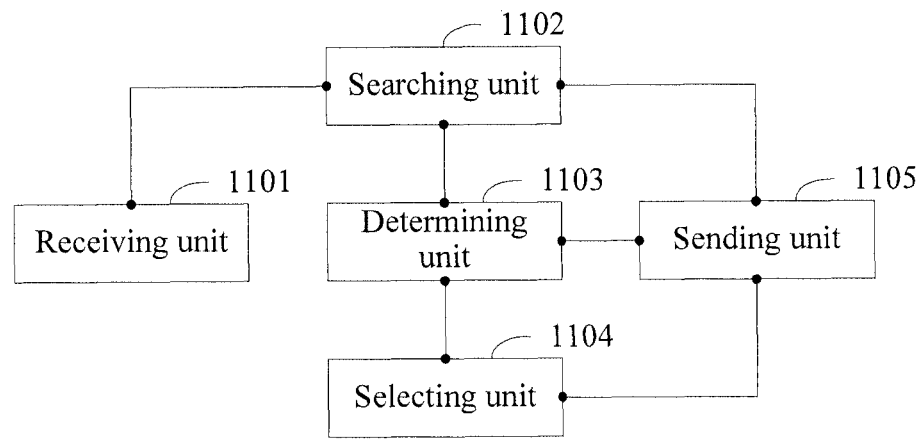
FIG. 11 is a structural view of a BS according to a first embodiment of the present invention.

FIG. 11 shows a structure of a BS according to a first embodiment, which includes a receiving unit 1101, a searching unit 1102, a determining unit 1103, a selecting unit 1104, and a sending unit 1105.

The receiving unit 1101 is adapted to receive packet data. The packet data includes an identity of the destination MS.

The searching unit 1102 is adapted to search the identity of the destination MS from an MS status table according to the packet data received by the receiving unit 1101.

The determining unit 1103 is adapted to determine whether an access status of the destination MS is direct access when the searching unit 1102 finds the identity of the destination MS.

The selecting unit 1104 is adapted to select a cluster head when the determining unit 1103 determines that the access status of the destination MS is not direct access.

The sending unit 1105 is adapted to send the packet data to a core network when the searching unit 1102 does not find the identity of the destination MS, send the packet data to the destination MS when the determining unit 1103 determines that the access status of the destination MS is direct access, and send the packet data to the cluster head selected by the selecting unit 1104 when the access status of the destination MS is not direct access.

As can be seen from the foregoing, in this embodiment, the BS can send the packet data to the destination MS or the cluster head directly according to the access status of the MS, so as to send the packet data to the destination MS through the cluster head, that is, partial link processing is performed at the MS, so that resource overhead of the BS is decreased.

Figure 12:
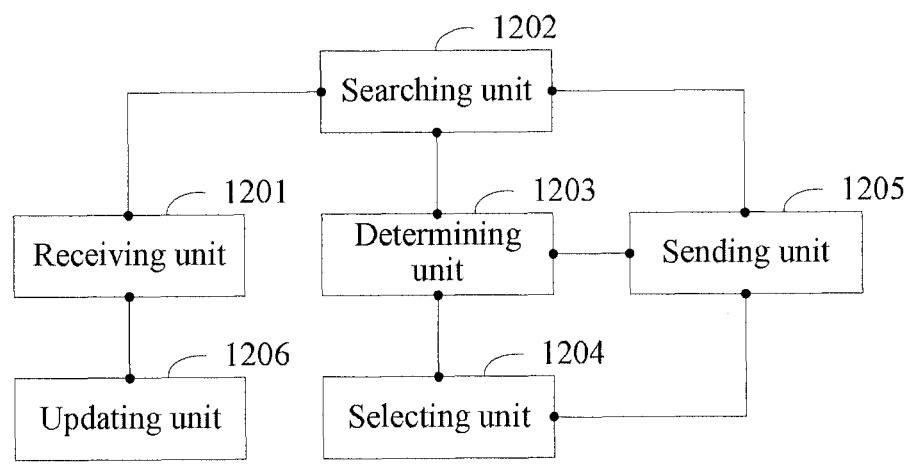
FIG. 12 is a structural view of a BS according to a second embodiment of the present invention.

FIG. 12 shows a structure of a BS according to a second embodiment, which includes a receiving unit 1201, a searching unit 1202, a determining unit 1203, a selecting unit 1204, a sending unit 1205, and an updating unit 1206.

The receiving unit 1201 is adapted to receive packet data including an identity of a destination MS and receive a cluster-head selection response for a cluster-head selection request from a cluster head. The cluster-head selection response includes resource information of the cluster head and information of a virtual cluster table.

The searching unit 1202 is adapted to search the identity of the destination MS from an MS status table according to the identity of the destination MS included in the packet data received by the receiving unit 1201.

The determining unit 1203 is adapted to determine whether an access status of the destination MS is direct access when the searching unit 1202 finds the identity of the destination MS.

The selecting unit 1204 is adapted to select a cluster head when the determining unit 1203 determines that the access status of the destination MS is not direct access.

The sending unit 1205 is adapted to send the packet data to a core network when the searching unit 1202 does not find the identity of the destination MS, send the packet data to the destination MS when the determining unit 1203 determines that the access status of the destination MS is direct access, send the packet data to the cluster head selected by the selecting unit 1204 when the access status of the destination MS is not direct access, and broadcast a cluster-head selection request. The cluster-head selection request includes a cell radius, cell utilization, and threshold values of the cluster head.

Through the cell radius, the cell utilization, and the threshold values of the cluster head included in the cluster-head selection request, the MS that receives the cluster-head selection request can confirm whether the MS is the cluster head.

The updating unit 1206 is adapted to update the MS status table according to the cluster-head selection response received by the receiving unit 1201.

As can be seen from the foregoing, in this embodiment, according to the access status of the MS, the BS can send the packet data to the destination MS directly or to the cluster head so that the cluster head sends the packet data to the destination MS, that is, partial link processing is performed at the MS, so that resource overhead of the BS is decreased, and at the same time the MS status table can be updated according to the cluster-head selection response, so that the records in the MS status table are kept correct, thereby increasing communication reliability.

Persons of ordinary skill in the art should understand that all or a part of the steps of the method according to the embodiments may be implemented by a computer program instructing relevant hardware. The program may be stored in a computer readable storage medium. When the program is run, the steps of the method according to the embodiments are performed. The storage medium may be a magnetic disk, an optical disk, a read-only memory (ROM) or a random access memory (RAM).

The method for sending packet data, the BS, and the MS according to the embodiments of the present invention are illustrated in detail in the foregoing. The description about the embodiments is merely provided for ease of understanding of the method and ideas of the present invention. Persons of ordinary skill in the art can make changes to the present invention in terms of the specific implementations and application scopes according to the ideas of the present invention. Therefore, the specification shall not be construed as a limit to the present invention.

What is claimed is:

1. A method of sending packet data for a mobile station (MS) in a cell, the method comprising:
   maintaining, by the MS, information of cluster head MSs including resource information of the cluster head MSs and utilization information of respective cells in which the cluster head MSs are located;
   receiving, by the MS, packet data from a source MS, wherein the packet data comprises an identity of a destination MS;
   searching by the MS for a path to the destination MS in a routing cache table;
   if the path is not found, forwarding the packet data by:
      selecting a cluster head MS from among the cluster head MSs according to the resource information of the cluster head MSs maintained by the MS, the maintained resource information of the selected cluster head MS including resource information of a cell interface of the cluster head MS, a path loss of a link between a cell interface of the MS and the cluster head MS, resource information of an adhoc interface of the cluster head MS and a path loss of a link between an adhoc interface of the MS and the cluster head MS, and according to the utilization information of the cell in which the cluster head MS is located and utilization of a the cell in which the MS is located;
      sending a cluster head MS request to the selected cluster head MS, wherein the cluster head MS request comprises the identity of the destination MS; and
      sending the packet data to the selected cluster head MS if a cluster head MS response sent by the selected cluster head MS is received by the MS.

2. The method for sending packet data according to claim 1, wherein the packet data further comprises a Time To Live (TTL) field, and if the cluster head MS response to be sent by the selected cluster head MS is not received, the method further comprises:
   subtracting 1 from a field value of the TTL field, and sending the cluster head MS request to the selected cluster head MS, until the field value of the TTL field becomes 0.

3. The method for sending packet data according to any one of claims 1 or 2, wherein if the path to the destination MS is found, forwarding the packet by:
   selecting an interface, and
   forwarding the packet data through the selected interface according to the found path, the selecting the interface comprises:
   comparing resource information of a cell interface of the destination MS and resource information of an adhoc interface of the destination MS recorded in virtual cluster information; and
   selecting the cell interface if the resource information of the cell interface is better than the resource information of the adhoc interface; and selecting the adhoc interface if the resource information of the adhoc interface is better than the resource information of the cell interface.

4. A method of sending packet data for a mobile station (MS) in cell, the method comprising:
   maintaining, by the MS, information of cluster head MSs including resource information of the cluster head MSs and utilization information of respective cells in which the cluster head MSs are located;
   obtaining packet data to be sent;
   determining whether an access status to a destination MS is direct access;
   if the access status to the destination MS is direct access, sending the packet data to a base station (BS); and
   if the access status to the destination MS is not direct access, forward the packet data by:
      selecting a cluster head MS from among the cluster head MSs according to the resource information of the cluster head MSs maintained by the MS, the maintained resource information of the selected cluster head MS including resource information of a cell interface of the cluster head MS, a path loss of a link between a cell interface of the MS and the cluster head MS, resource information of an adhoc interface of the cluster head MS and a path loss of a link between an adhoc interface of the MS and the cluster head MS, and according to the utilization information of the cell in which the cluster head MS is located and utilization of the cell in which the MS is located;
      sending a cluster head MS request to the selected cluster head MS, wherein the cluster head MS request comprises the identity of the destination MS; and
      sending the packet data to the selected cluster head MS if a cluster head MS response sent by the selected cluster head MS is received by the MS.

5. The method according to claim 4, before the selecting the cluster head MS from the cluster head MSs information, the method further comprising:
   determining a type of a service corresponding to the packet data;
   if the type of the service corresponding to the packet data is a cell access service, selecting a cell cluster head from the cluster head MSs information; and
   if the type of the service corresponding to the packet data is an adhoc access service, selecting an adhoc cluster head MS from the cluster head MSs information.

6. The method for sending packet data according to claim 4 or 5, before the sending the packet data to the selected cluster head MS, the method further comprising:
   adding a Time To Live (TTL) field in the packet data, and setting a field value of the TTL field.

7. A mobile station (MS), comprising:
   a processing unit adapted to maintain information of cluster head MSs including resource information of the cluster head MSs and utilization information of a respective cells in which the cluster head MSs are located;
   a receiving unit, adapted to receive packet data from a source MS, wherein the packet data comprises an identity of a destination MS;

a searching unit, adapted to search a path to the destination MS in a routing cache table according to the identity of the destination MS received by the receiving unit,
if the path is not found, forward the packet data by:
selecting a cluster head MS from among the cluster head MSs according to the resource information of the cluster head MSs maintained by the MS, the maintained resource information of the selected cluster head MS including resource information of a cell interface of the cluster head MS, a path loss of a link between a cell interface of the MS and the cluster head MS, resource information of an adhoc interface of the cluster head MS and a path loss of a link between an adhoc interface of the MS and the cluster head MS, and according to the utilization information of the cell in which the cluster head MS is located and utilization of a cell in which the MS is located;
sending a cluster head MS request to the selected cluster head MS, wherein the cluster head request MS comprises the identity of the destination MS; and
sending the packet data to the selected cluster head MS if a cluster head MS response sent by the selected cluster head MS is received by the MS.

8. The MS according to claim 7, further comprising:
a calculating unit, adapted to subtract 1 from a field value of a Time To Live (TTL) field when the packet data received by the receiving unit further comprises the TTL field and the receiving unit does not receive the cluster head MS response to be sent by the cluster head MS, and trigger the sending unit to send the cluster head MS request to the selected cluster head MS until the field value of the TTL field becomes 0.

9. The MS according to any one of claims 7 or 8, wherein if the path to the destination MS is found,
selecting an interface, and
forwarding the packet data through the interface selected according to the path to the destination MS found by the searching,
the selecting of the interface further comprises:
comparing resource information of a cell interface of the destination MS and resource information of an adhoc interface of the destination MS recorded in virtual cluster information; and
selecting the cell interface when the comparing determines that the resource information of the cell interface is better than the resource information of the adhoc interface, and select the adhoc interface when the comparing determines that the resource information of the adhoc interface is better than the resource information of the cell interface.

* * * * *

UNITED STATES PATENT AND TRADEMARK OFFICE
CERTIFICATE OF CORRECTION

Page 1 of 1

PATENT NO. : 9,167,497 B2
APPLICATION NO. : 12/855169
DATED : October 20, 2015
INVENTOR(S) : Hongcheng Zhuang It is certified that error appears in the above-identified patent and that said Letters Patent is hereby corrected as shown below:

IN THE CLAIMS

Claim 1, Column 17, Line 47

Delete "of a the" and insert --of the--, therefor.

Claim 7, Column 19, Line 17

Delete "of a the" and insert --of the--, therefor.

Signed and Sealed this
Second Day of February, 2016

Michelle K. Lee
*Director of the United States Patent and Trademark Office*